United States Patent [19]

Rudell et al.

[11] Patent Number: 4,500,104
[45] Date of Patent: Feb. 19, 1985

[54] BICYCLE AND DOLL MECHANISM

[75] Inventors: Elliot A. Rudell, 2215 W. 237 St., Torrance, Calif. 90501; Michael E. Shumate, Manhattan Beach; Joseph S. Cernansky, Gardena, both of Calif.

[73] Assignee: Elliot A. Rudell, Lawndale, Calif.

[21] Appl. No.: 475,969

[22] Filed: Mar. 16, 1983

[51] Int. Cl.³ .............................................. B62K 3/00
[52] U.S. Cl. ............................. 280/289 D; 280/1.167; 280/1.203
[58] Field of Search .......... 280/289 A, 289 D, 289 H, 280/1.167, 1.203, 1.204; 46/204, 109

[56] References Cited

U.S. PATENT DOCUMENTS

| | | | |
|---|---|---|---|
| 1,371,959 | 3/1921 | Welcome | 272/31 R |
| 1,799,402 | 4/1931 | Yancey | 280/1.67 |
| 2,511,169 | 6/1950 | McAvoy | 46/109 |
| 2,578,682 | 12/1951 | Fernstrom | 280/1.14 |
| 3,119,197 | 1/1964 | Adams | 46/97 |
| 3,259,395 | 7/1966 | Blair | 280/1.203 |
| 3,284,090 | 11/1966 | Blair | 280/1.167 |
| 4,047,325 | 9/1977 | Yamazaki | 46/106 |
| 4,124,950 | 11/1978 | Becker | 46/109 |

FOREIGN PATENT DOCUMENTS 122196 9/1946 Australia .

Primary Examiner—Joseph F. Peters, Jr.
Assistant Examiner—Donn McGiehan
Attorney, Agent, or Firm—Willian, Brinks, Olds, Hofer, Gilson & Lione, Ltd.

[57] ABSTRACT

A child's combination toy comprising a bicycle, or tricycle, to the frame of which a seated doll is attached in front of the handlebars. The doll is seated with its hands grasping a miniature set of handlebars and its feet resting on a miniature set of pedals which are coupled to the cycle's front wheel by a gearing and friction-drive arrangement. The legs of the doll are flexible so that they are moved by means of the pedal action in correspondence with the action of the legs of the cycle's rider. The doll also turns in correspondence with the turning of the cycle's handlebars. The actions of the doll cause it to appear to be operating the cycle in conjunction with the actual operator.

41 Claims, 4 Drawing Figures

BICYCLE AND DOLL MECHANISM

BACKGROUND OF THE INVENTION

This invention relates to a child's pedalling toy and, more particularly, to a child's pedal-operated vehicle on which a doll is mounted to simulate a second rider.

Children greatly enjoy the companionship of other children at most times. Little girls, especially, often substitute the companionship of dolls for human companionship, a doll becoming almost human through the medium of the child's imagination. Various devices have been employed to increase the illusion of the humanness and animate existence of dolls; for example, dolls are manufactured which talk, wet their diapers, close and open their eyes, etc. The present invention provides companionship for a child while he or she is riding a pedal-operated vehicle of the cycle type without depending upon the presence or availability of another child.

(Hereinafter, the term "cycle" will be used to refer to pedal-operated vehicles, e.g., a bicycle or tricycle, regardless of the number of wheels employed.)

An object of this invention is to provide a child with the companionship of a doll while the child is riding on a cycle.

Another object is to provide a child with a doll on his/her cycle which doll simulates the motions of a second rider on the vehicle.

SUMMARY OF THE INVENTION

The present invention is directed to a combination toy in which a doll is affixed to the front of a child's cycle. The doll is seated on a structure which is coupled with the handlebars of the cycle so that the doll turns in correspondence with the turning of the handlebars. The doll's arms are attached to a small-scale set of handlebars and the doll's feet are attached to the pedals of a small-scale pedal-and-crank arrangement in which a set of gear wheels is coupled for rotation by the front wheel of the cycle. The rotational movement of the front wheel is transmitted by the gear wheels to a crank on which pedals are mounted, the doll's feet being fastened to the pedals. The doll's legs, which are flexible, are therefore rotated by the rotation of the cycle's front wheel.

Thus, as the child pedals and steers the cycle, the doll's legs pedal in correspondence with the child's legs and the doll's body turns in synchronism with the turning of the cycle's handlebars. The doll thus appears to be a small, animate second rider on the child's cycle. The doll can also be removed from the cycle for play.

The invention itself, together with further objects and attendant advantages, will best be understood by reference to the following detailed description taken in connection with the accompanying drawings.

DETAILED DESCRIPTION

Figure 1:
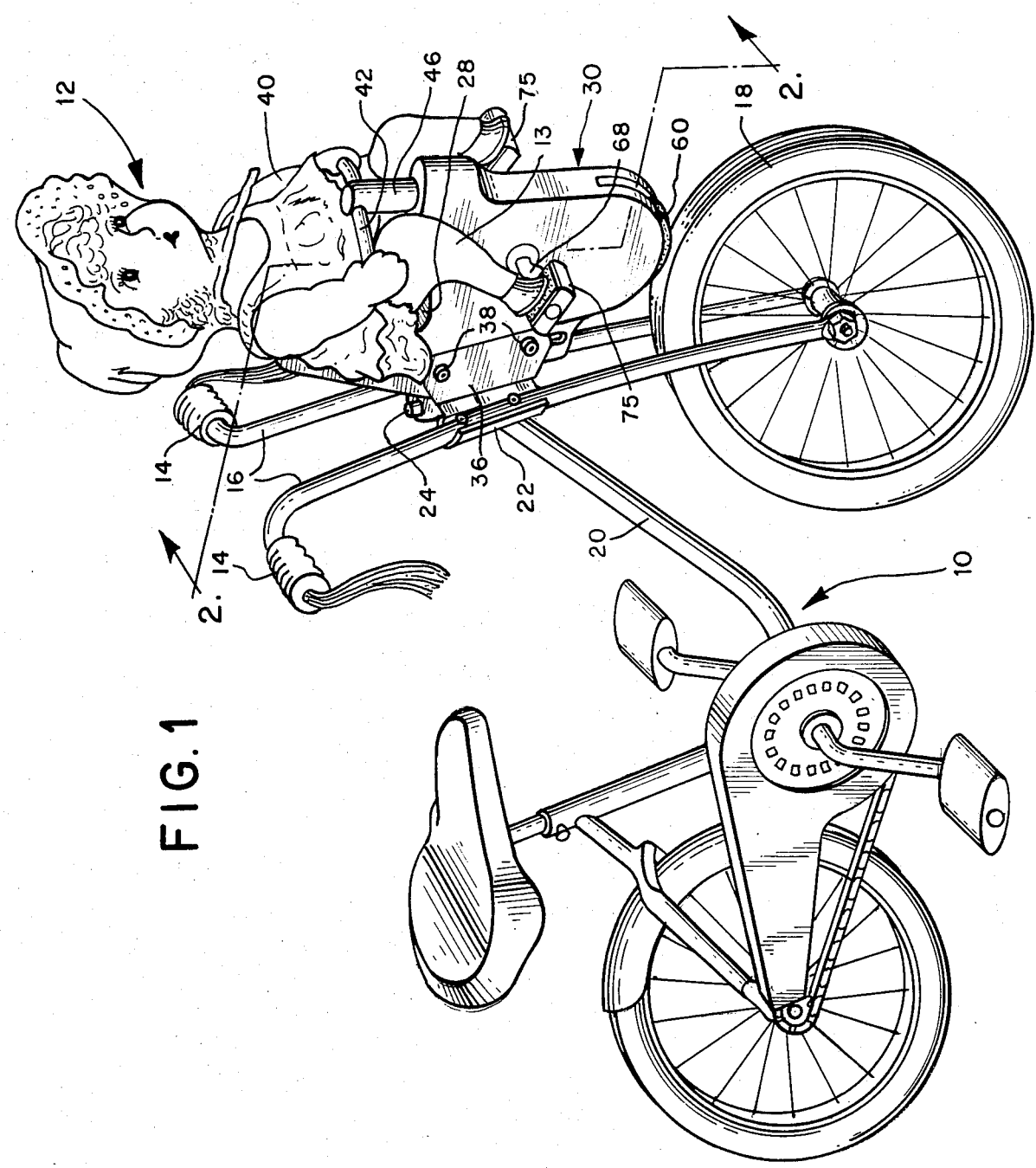
FIG. 1 is a schematic illustration of a preferred embodiment of the invention.

Referring now to the drawings, FIG. 1 shows a schematic side view of a child's cycle 10 to which a doll 12 is attached in front of the handlebars 14. In this embodiment, each handlebar is furnished with its own post 16 which is attached at its lower end to the front wheel 18. (In other embodiments, both handlebars may be attached to a single post which is attached to a fork member which, in turn, is attached to the wheel.)

The handlebar posts 16 are attached to the frame 20 of the cycle 10. A head plate 22 is fixedly attached to the posts 16 by any suitable means, such as rivets or bolts, and the head plate 22 is also attached to a rotating member 24 which is retained by and capable of rotation within the cylindrical head cap 26 (see FIGS. 2 and 3). The head cap 26 is affixed to the frame 20 of the cycle 10. Thus, rotatable support for the handlebars 14 and posts 16 is provided by the head cap 26 and the head plate 22.

The doll 12 is seated on a seat 28 which is formed as the upper portion of a gear box 30. The doll 12 has a piece of fabric provided with releasable interconnecting hooks, such as that sold under the trademark "Velcro" (not shown) attached to its bottom which mates with and secures the doll to a second mating piece of such fabric 32 (see FIGS. 2 and 4) fastened to the seat 28 by means of an adhesive backing, for example. A mounting bracket 36 is attached to the back of the gearbox 30 by means of bolts 38 or other suitable means and is also attached to the head plate 22 by means of rivets 39 (see FIGS 2-4), or other suitable means which keep the plate and bracket fixedly attached to each other.

The doll's arms 40 extend to the ends of a set of miniature handlebars 42 which may be integral with or affixed by any suitable means, such as welding or pins, to a post 46. The post 46 is fixedly attached to the seat portion of the gearbox 30 by any suitable means, such as a bolt 48 and a nut 49 arrangement (see FIG. 4), the bolt 48 passing through a hole 50 in post 46. Post 46 passes through hole 51 in the top of the seat portion. The hands of the doll 12 are fastened to the ends of the miniature handlebars 42 by means of mating strips of fabric containing releasable interconnecting hooks, for example, the handlebar strips 52 being shown in FIGS. 2 and 4; or by loops which slip over the handlebar ends.

Figure 2:
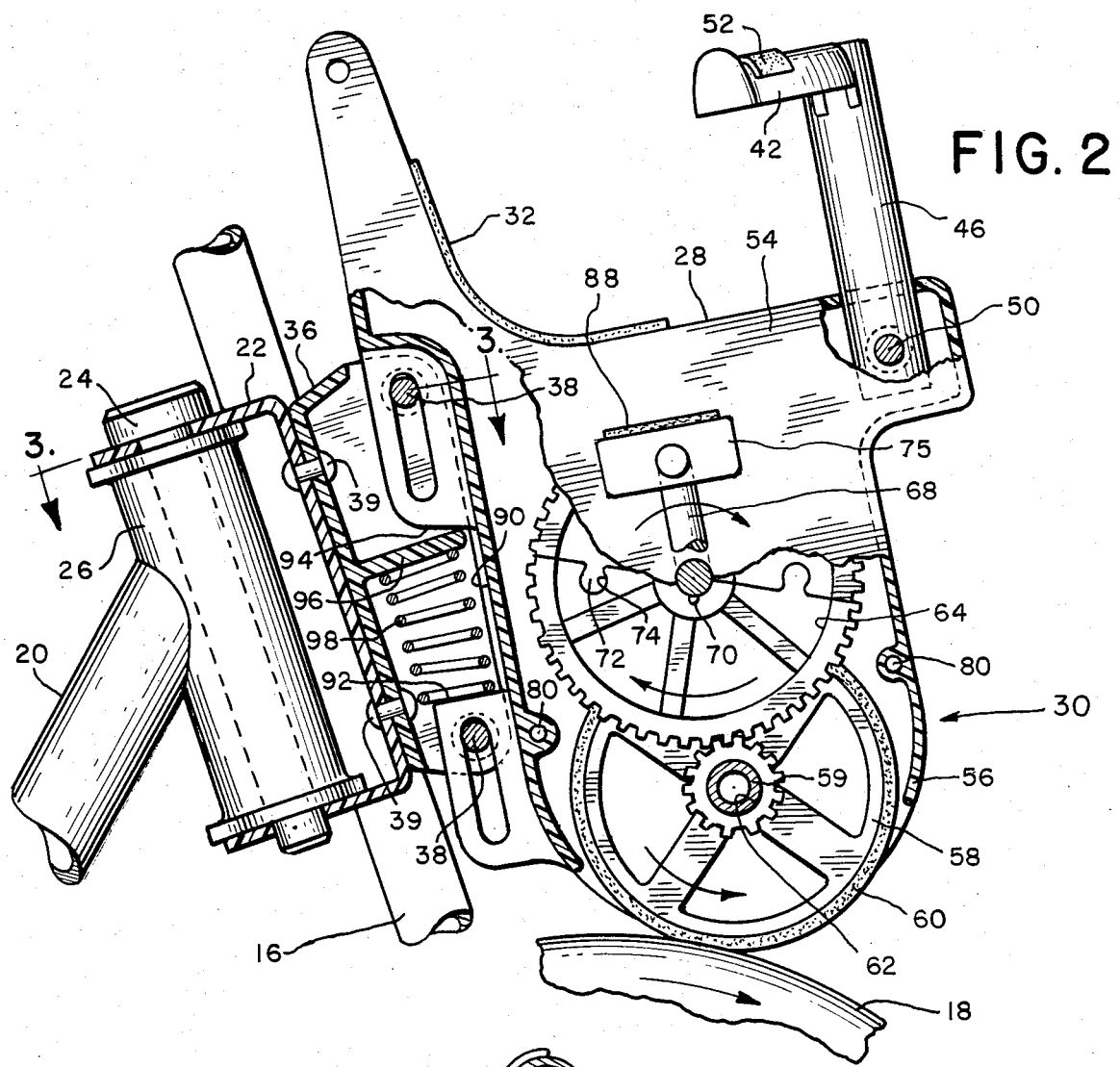
FIG. 2 is a detail view, taken along line 2—2 of FIG. 1, showing the gearing, gearbox and other components for causing the doll's legs to rotate in correspondence with the child's legs.
Figure 3:
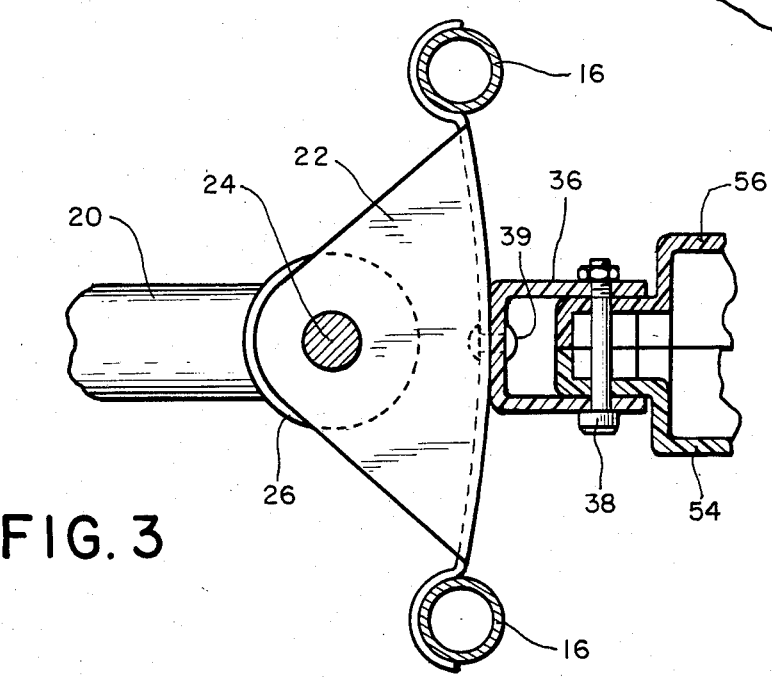
FIG. 3 is a detail view along lines 3—3 of FIG. 2, showing the manner in which the handlebars of the cycle are mounted to the frame of the cycle.
Figure 4:
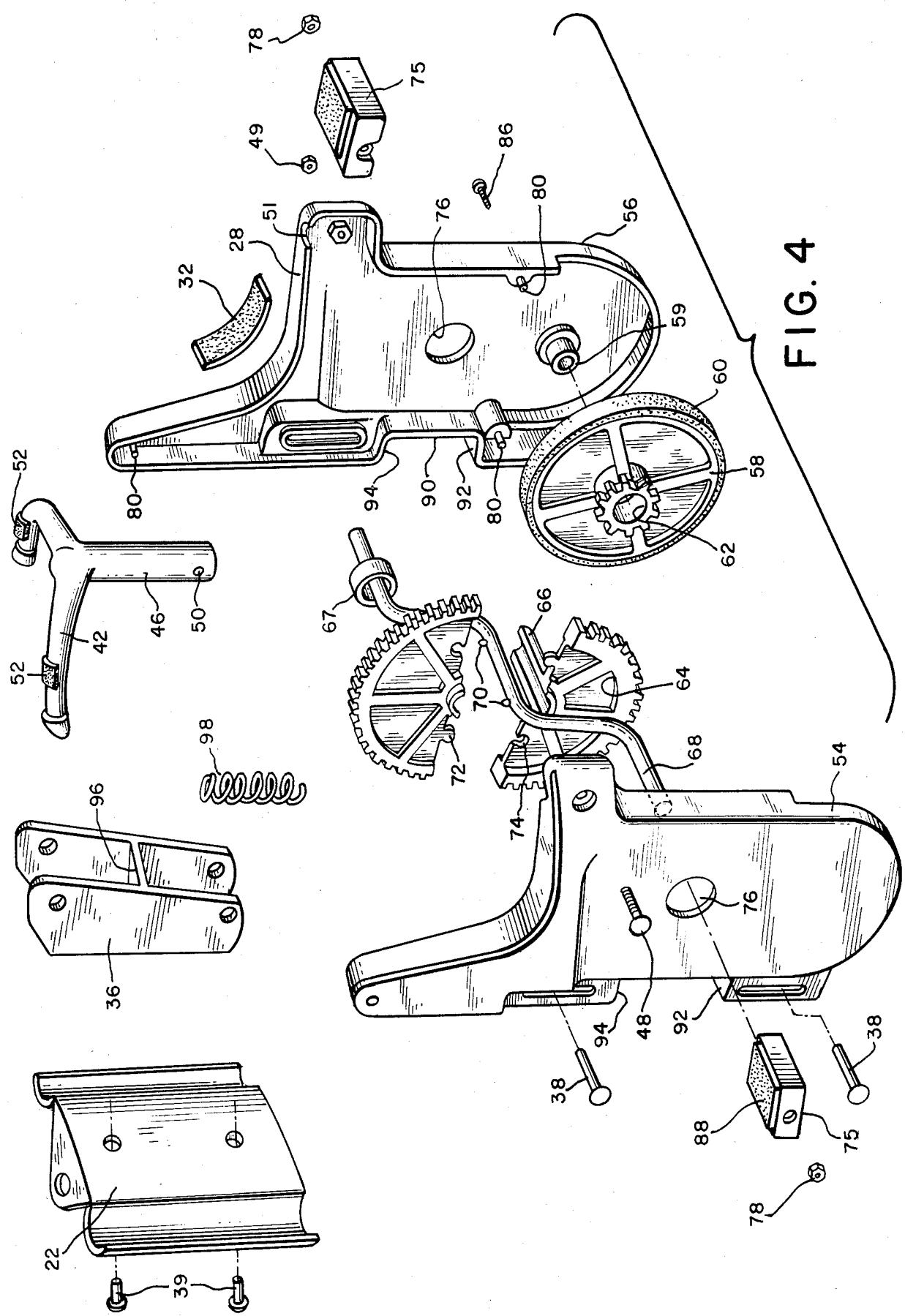
FIG. 4 is an exploded view of the gearing, gearbox and other components of the invention.

The gearbox 30, as shown in FIGS. 2 and 4, is formed in two parts, a right-hand half 54 and a left-hand half 56, as viewed by the rider seated on the cycle 10. Pins 80 can be provided in one or the other section of the gearbox and mating holes or recesses can be provided in the other section, so that the two sections fit precisely together. Screws 86 secure the two halves of the gearbox together. The axle 59 for the drive wheel 58 fits into a recess (not shown) in the left-hand half 56 of the gearbox 30. The gearbox 30 supports the gearing assembly members.

According to one embodiment of the invention, the gear assembly comprises a pedal-and-crank assembly and associated gear wheels. Although technically, the drive wheel 58 is not a true "gear" wheel since it has no teeth on its periphery and is preferably rotated by friction drive, the three wheels 58, 62 and 64 in the gear train will be referred to herein as "gear wheels" since they are functionally similar members of the gear train, deriving rotational force from the cycle's front wheel and delivering rotational force to the miniature crank 68. The components are easily seen in FIG. 4. A drive wheel 58 carries a rubber band 60 around its periphery. The rubber band 60 is maintained in contact with the periphery of the front wheel 18 of the cycle by spring action of spring 98. The drive wheel 58 is supported on an axle 59 and, in turn, supports a geared wheel, or cogwheel, 62 which is preferably integral with the drive wheel 58. The teeth on the cogwheel 62 mesh with peripheral gear teeth on a driven gear wheel 64. The driven wheel 64 is formed in two parts with a central tubular portion 66 which receives the central portion of a crank 68. The crank 68 is provided with projections 70 thereon which engage mating slots (not shown) formed in the inner surfaces of the top and bottom sections of the central tubular portion 66 of the driven wheel 64 when the two sections of the driven wheel 64 are fitted together and locked by any suitable means, such as the ball 72 and socket 74 joints shown. The crank 68 extends through holes 76 through the sides of the gearbox 30. A sleeve 67 is slipped over the upper and lower parts of tubular portion 66, in which the crank 68 rests, in order to keep the parts of the tubular portion 66 together. A pair of pedals 75 is fitted on the ends of the crank 68 and retained thereon by suitable means, such as endcaps 78. A strip 88 of fabric containing releasable interconnecting hooks is adhered to each pedal 75 and a mating strip (not shown) is affixed to the bottom of each doll's foot whereby each foot is maintained in secure contact with its associated pedal.

It is, of course, evident that the gearbox and the seat sections may be individually formed components which are securely attached to each other by suitable means such as bolts and nuts, adhesives, or rivets.

As stated previously, the drive wheel 58 is urged downward into contact with the top of the front wheel 18 of the cycle 10. The rear of the gearbox 30 is formed with an indentation 90 which defines a lower shoulder 92 and an upper overhang 94. The mounting bracket 36 is formed with a ledge 96 between its upper and lower ends. Spring 98 is placed in compressed condition between the ledge 96 and the shoulder 92 urging the gearbox 30, and therefore the gear wheel 58, downward at all times. The ledge 96 of the mounting bracket 36 is seated under the overhang 94 of the gearbox indentation 90.

According to other embodiments of the invention, the crank is driven by combinations of friction wheels and pulleys, which may be driven by frictional contact with front wheel 18 or by pulley belts which are driven by pulleys mounted on the axle of front wheel 18. Furthermore, the drive train may include bevel gears mounted on a shaft perpendicular to the axle of the drive wheel and the miniature crank of the doll's pedals, for transmitting rotational motion from the front wheel to the miniature crank, and engaging mating bevel gears on the axle of the drive wheel and on the miniature crank.

The gearbox 30 and gear wheels 58, 62, 64 should be made of a material which has good dimensional stability, such as polypropylene. The seat and miniature handlebars 42 may also be fabricated from polypropylene. The crank 68 may be fabricated from music wire. The doll 12 may, for example, be made of cloth and stuffed with a filling of shredded material to provide the legs 13 with motility. Such material may be polyfill, or cotton, or urethane foam, for example. The spring 98 should be formed from spring steel. The mounting bracket 36 and head plate 22 may be fabricated from a strong, rigid plastic material, such as polypropylene, or, alternatively, from a metal, such as aluminum. The pedals 75 may be fabricated from polypropylene.

In operation, the pedalling action of the child on the cycle rotates the cycle's front wheel 18 thereby impelling the driving wheel 58, the cogwheel 62, the driven wheel 58, the crank 68 and the doll's feet in correspondence with the pedalling action of the child's feet. The child's steering actions turn the cycle's handlebars 14 and this turning movement is coupled to the gearbox 30 to which the doll 12 is attached. This turns the miniature handlebars 42 and the doll 12 in correspondence with the steering movements of the child's arms.

What has been described is a novel type of toy in which a doll 12 has been combined with a child's cycle 10. The doll 12 is provided with its own miniature handlebars 14 and pedals 75 and is coupled to turn, with the handlebars 14 of the cycle 10 and to have its legs 13 rotated by rotation of the cycle's front wheels 18 in such a manner that the doll appears to be steering and pedalling in concert with the child who is riding the cycle. Though the embodiments of the device disclosed herein are preferred, numerous modifications and variations within the scope of the invention may be come apparent to those skilled in the art. Accordingly, all such modifications and variations are intended to be covered by the appended claims.

We claim:

1. A doll assembly for use with a cycle, the cycle having handlebars and a front wheel; the front wheel coupled to be turned by the handlebars; the doll assembly simulating a second rider on the cycle and comprising:

a doll with arms and motile legs;

a set of miniature handlebars, doll seat structure, and crank means, the crank means coupled to be rotated by and in the same rotational direction as the cycle's front wheel;

the hands of the doll being fastened to the miniature handlebars and the feet of the doll being fastened to the crank means;

the doll appearing to be steering and pedalling in concert with the actions of the rider when the cycle is being ridden.

2. The invention defined in claim 1 wherein the doll is fabricated from cloth and is stuffed with shredded material.

3. The invention defined in claim 1 wherein the doll is fabricated from cloth and is stuffed with polyfill material.

4. The invention defined in claim 1 wherein the handlebars, doll seat structure and crank assembly is fixedly coupled with the cycle's handlebars for turning therewith.

5. The invention defined in claim 1 wherein the handlebar and crank assembly further comprises a set of coupled gear wheels, the first gear being driven by the cycle's front wheel in an opposite direction of rotation of the cycle's front wheel, and a second gear attached to the crank assembly and driven off the first gear in the same rotational direction as the cycle's front wheel.

6. The invention defined in claim 1 wherein the hands of the doll are removably fastened to the miniature handlebars and the feet of the doll are removably fastened to the crank means.

7. The invention defined in claim 1 wherein the hands of the doll are removably fastened to the miniature handlebars and the feet of the doll are permanently fastened to the crank means.

8. The invention defined in claim 1 wherein the hands of the doll are permanently fastened to the miniature handlebars and the feet of the doll are removably fastened to the crank means.

9. The invention defined in claim 1 wherein the hands of the doll are permanently fastened to the miniature handlebars and the feet of the doll are permanently fastened to the crank means.

10. A doll assembly for a child's cycle having a set of handlebars and a front wheel coupled to be turned by said handlebars, the assembly comprising:
a doll having motile legs;
pedal-and-crank means coupled with the front wheel of the cycle for rotation by and in the same rotational direction as the front wheel, the feet of said doll being attached to the pedal-and-crank means for movement thereby in a manner such that the doll's feet appear to be pedalling; and
a set of miniature handlebars,
a miniature handlebars being attached to the pedal-and-crank means and the hands of the doll being attached to the miniature handlebars,
the doll assembly being coupled to turn with the turning of the cycle's handlebars,
such that the doll appears to be steering and pedalling in concert with the movements of the rider of the cycle.

11. A doll assembly as defined in claim 10 wherein the doll is fabricated from cloth and is stuffed with polyfill material.

12. A doll assembly as defined in claim 10 wherein the pedal-and-crank means comprises a set of coupled gear wheels one of which is in contact with and driven by the front wheel of the cycle and crank means driven by another of the gear wheels, the feet of the doll being attached to the crank means.

13. A doll assembly as defined in claim 12 further including biasing means coupled to the casing and urging the casing toward the front wheel of the cycle so that one of the gear wheels is maintained in contact with the front wheel.

14. A doll assembly for a child's cycle, the cycle having a set of handlebars and a front wheel; the doll assembly coupled to be turned by the handlebars, the assembly comprising:
a doll having motile legs;
a set of miniature handlebars; and
a pedal-and-crank assembly comprising a casing, a set of gear wheels within the casing driven by contact with the front wheel of the cycle, a crank driven by the gear wheels, and pedals attached to and rotated by the crank,
the feet of the doll being attached to the pedals for movement thereby,
the miniature handlebars being attached to the casing and the hands of the doll being affixed to the miniature handlebars, and
the doll assembly being coupled to turn with the turning of the cycle's handlebars,
such that the doll appears to be steering and pedalling in concert with the rider of the cycle.

15. A doll assembly as defined in claim 14 wherein the top of the casing defines a seat on which the doll sits.

16. A doll assembly as defined in claim 14 wherein the gear wheels and casing are fabricated from polypropylene.

17. A doll assembly as defined in claim 14 wherein the means for attaching the doll's hands and feet are pieces of fabric provided with releasable interconnecting hooks.

18. A doll assembly as defined in claim 14 wherein the set of gear wheels comprises a drive wheel in contact with and driven by the front wheel of the cycle, a cogwheel coupled to the drive wheel for rotation thereby, and a driven wheel in contact with the cogwheel for rotation thereby, the crank being coupled to the driven wheel for rotation thereby.

19. A doll assembly as defined in claim 14 wherein the casing supports the set of gear wheels, and the doll assembly further includes biasing means coupled to the casing for urging the drive wheel into continual contact with the front wheel of the cycle.

20. A doll assembly as defined in claim 14 wherein the doll is fabricated from cloth and is stuffed with shredded material.

21. A doll assembly as defined in claim 14 wherein the doll is fabricated from cloth and is stuffed with polyfill material.

22. A doll assembly for use with a cycle having handlebar means coupled to turn its front wheel, the doll assembly simulating a second rider on the cycle and comprising:
a doll with arms and motile legs;
pedal-and-crank means having a crank and a pair of pedal portions to which the feet of the doll are attached, the pedal-and-crank means including a casing formed with an upper surface which defines a seat to which said doll is fastened in a sitting position, the pedal-and-crank means being coupled to the front wheel of the cycle in such manner that the pedal portions of the doll's feet are rotated by and in correspondence with the rotation of the front wheel;
a set of miniature handlebars fixedly attached to said seat, the hands of the doll being attached to the miniature handlebars; and
means for fixedly coupling the casing to the handlebar means of the cycle in such manner that the doll turns in correspondence with the turning of the handlebar means;
so that, when the cycle is being propelled by a rider, the doll also appears to be pedalling and steering the cycle.

23. The invention defined in claim 22 wherein the doll is fabricated from cloth and is stuffed with a shredded material.

24. The invention defined in claim 22 wherein the doll is fabricated from cloth and is stuffed with polyfill material.

25. The invention defined in claim 24 wherein the casing supports the set of gear wheels, and the doll assembly further includes biasing means coupled to the casing for urging one of the set of gear wheels into continual contact with the front wheel of the cycle.

26. The invention defined in claim 25 wherein the gear wheels comprise a drive wheel in contact with and driven by the front wheel of the cycle, a cogwheel coupled to the drive wheel for rotation thereby and a driven wheel in contact with the cogwheel for rotation thereby, the crank being coupled to the driven wheel for rotation thereby.

27. The invention defined in claim 26 wherein the gear wheels and casing are fabricated from polypropylene.

28. The invention defined in claim 26 wherein the drive wheel is driven by the cycle's front wheel by means of friction drive.

29. The invention defined in claim 26 wherein the cogwheel and the driven wheel are geared wheels.

30. The invention defined in claim 26 further comprising a rubber band positioned around the periphery of the drive wheel.

31. A toy comprising:
a cycle comprising handlebar means, a front wheel, and means coupling the handlebar means to turn the front wheel; and
a doll assembly including a doll with arms and motile legs, the doll assembly being coupled to the handlebar means for turning the doll in correspondence with the turning of the handlebar means and coupled to the cycle's front wheels for moving the extremities of the doll's legs in correspondence with and in the same rotational direction as the rotation of the cycle's front wheel,
the doll appearing to be steering and pedalling in concert with the actions of the rider when the cycle is being ridden.

32. A toy comprising:
a cycle comprising handlebar means, a front wheel, and means coupling the handlebar means to turn the front wheel; and
a doll with arms and motile legs;
pedal-and-crank means having a crank and a pair of pedal portions to which the feet of the doll are attached, the pedal-and-crank means including a casing formed with an upper surface which defines a seat to which the doll is fastened in a sitting position, the pedal-and-crank means being coupled to the front wheel of the cycle in such manner that the pedal portions and the doll's feet are rotated by and in correspondence with the rotation of the front wheel;
a set of miniature handlebars fixedly attached to the pedal-and-crank means, the hands of the doll being attached to the miniature handlebars; and
means for fixedly coupling the casing to the handlebar means of the cycle in such manner that the doll turns in correspondence with the turning of the handlebar means,
so that, when the cycle is being propelled by a rider, the doll appears to be steering and pedalling in concert with the action of the rider.

33. The invention defined in claim 32 wherein the doll is fabricated from cloth and is stuffed with polyfill material.

34. The invention defined in claim 32 wherein the pedal-and-crank means comprises a set of coupled gear wheels, one being driven by the front wheel of the cycle and a different one driving the crank.

35. The invention defined in claim 34 wherein the casing supports the set of gear wheels, and the toy further comprises biasing means coupled to the casing for urging one of the set of gear wheels into continual contact with the front wheel of the cycle.

36. The invention defined in claim 35 wherein the biasing means is a spring.

37. The invention defined in claim 35 wherein the gear wheels comprise a drive wheel in contact with and driven by the front wheel of the cycle, a cogwheel coupled to the drive wheel for rotation thereby and a driven wheel in contact with the cogwheel for rotation thereby, the crank being coupled to the driven wheel for rotation thereby.

38. The invention defined in claim 37 wherein the gear wheels and casings are fabricated from polypropylene.

39. The invention defined in claim 37 wherein the drive wheel is driven by the cycle's front wheel by means of friction drive.

40. The invention defined in claim 37 wherein the cogwheel and the driven wheel are geared wheels.

41. The invention defined in claim 37 further comprising a rubber band positioned around the periphery of the drive wheel.

* * * * *